Jan. 3, 1956  E. W. KLEINPETER  2,729,731
FEED APPARATUS
Filed July 10, 1953
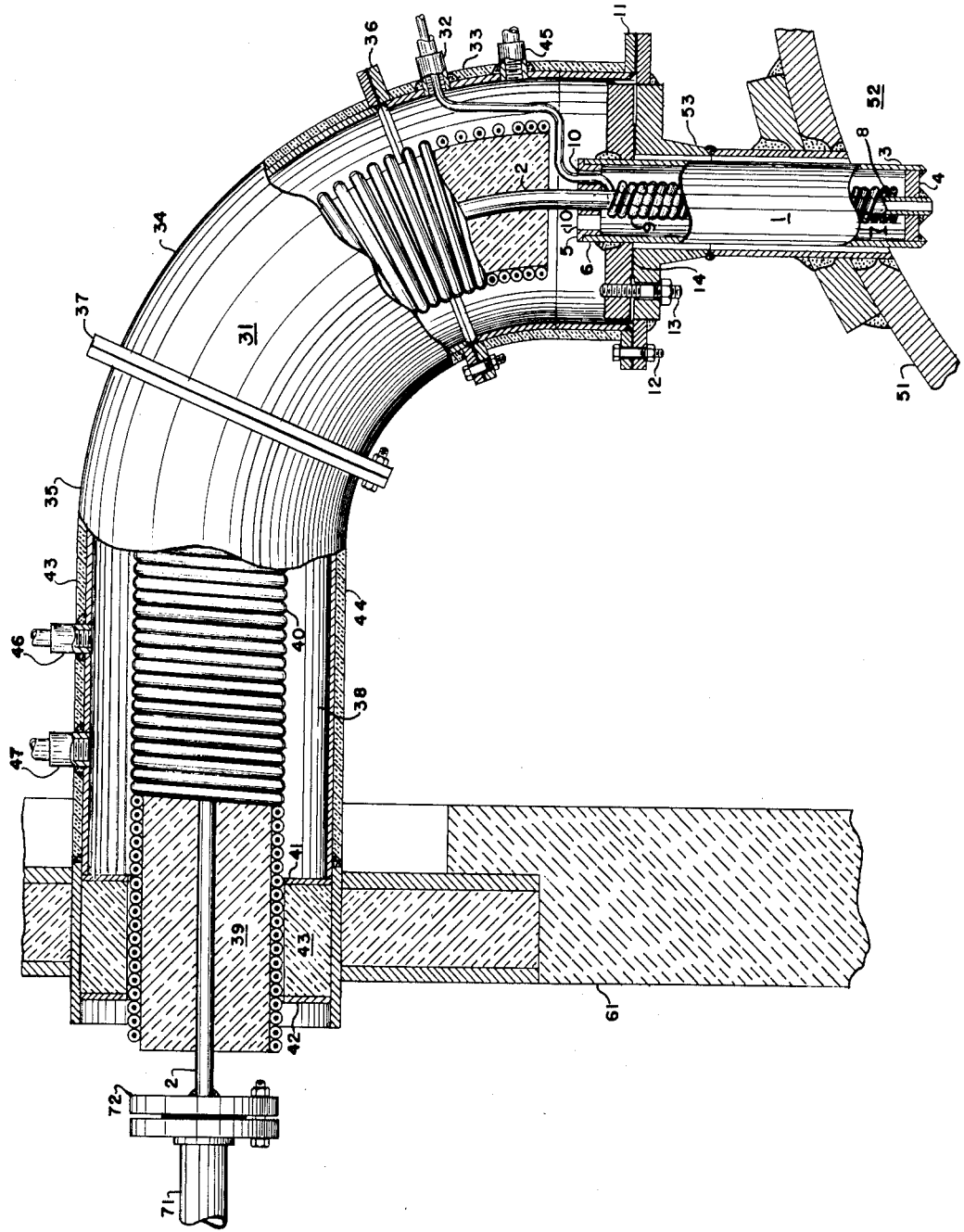

United States Patent Office 2,729,731
Patented Jan. 3, 1956

2,729,731

FEED APPARATUS

Edward W. Kleinpeter, Baton Rouge, La., assignor to Ethyl Corporation, New York, N. Y., a corporation of Delaware Application July 10, 1953, Serial No. 367,171

4 Claims. (Cl. 219—10.51)

This invention relates to an apparatus for introducing a high melting liquid into an isolated reaction space. More particularly, but not exclusively, it relates to a feed nozzle construction for maintaining a relatively high temperature in a feed conduit for introducing a high melting liquid into a pressurized reaction zone.

In industrial practice, the transfer of high melting point materials has been an expensive and difficult operation. The introduction of a highly reactive material having a high melting point into a pressurized reaction space containing other highly reactive materials is a difficult operation. The addition of a highly reactive material to a reaction mixture is a dangerous operation which must be carefully controlled at all times. For high melting materials the problem is further magnified by the difficulty of maintaining a liquid flow at all times, particularly in a feed nozzle for the introduction of the material into an isolated pressurized reaction zone. The safe handling of reactive materials at relatively high temperatures is another problem encountered in this feeding operation. A small leak in the feed conduit can result in a dangerous fire if the hot reactive material is permitted to come into contact with a combustible atmosphere. In reactions employing a flammable low boiling liquid as one of the reactants, a further fire hazard results from the accidental contact of vapors of this liquid with the hot feed conduit used to transfer the high melting liquid from a supply source to within the reaction space.

In reactions employing a high melting feed material it is often necessary to intermittently stop the flow of material into the reaction vessel with possible resultant plugging of the feed nozzle if the conduit is permitted to cool. In starting up the flow of material, it is necessary to have a quick transfer of heat to the material in the conduit so that it may rapidly liquefy and start to flow into the reaction vessel. Further, in feeding a high melting material into a reaction vessel operating at a temperature below the melting point of the feed material, great difficulty is often experienced in preventing a build-up of the solid material at the exit orifice of the feed nozzle due to the cooling effect of the surrounding atmosphere. Another problem encountered in processes employing a high melting feed material into a pressurized reaction vessel is the usual necessity of isolating the vessel from general factory space by an enclosure wall.

Heretofore, these problems have not been solved in any satisfactory manner. In the transfer of high melting point materials jacketing of the transfer lines has been required as well as the frequent employment of direct-fire or electrical resistance heater elements as the means of heating the transfer line. Such means have distinct disadvantages. For instance, direct-fire heating is a hazardous as well as inefficient means of heating such transfer lines. The presence of an open flame entails a constant fire hazard particularly if applied to a transfer apparatus for reaction system having a flammable material as one of the reactants. Direct-fire heating is inefficient due to heat losses from radiation and convection. Further, direct-fire heating is particularly unadaptable for heating a feed nozzle which must be introduced into a reaction vessel.

Electrical resistance heaters, on the other hand, also present a number of disadvantages. Thus, in the use of these electrical resistance heaters the localized application of their heat results in the over-heating of the material in contact with the heater element. Another disadvantage apparent in the use of electrical resistance heaters is their relatively short useful life. The high temperatures to which these resistance heaters must be heated in order that they provide the desired heat to the feed conduit is conducive to a high corrosion rate of the resistor elements and necessitates frequent replacements which are costly and time consuming. A further disadvantage of electric resistance is the excessive time required to liquefy the high melting solid, since the heat must be transferred from the heater to the conduit wall and then to the body of the material necessarily fed in the liquefied state.

It is accordingly an object of this invention to overcome the above and other shortcomings of the prior art and provide an apparatus for maintaining a high melting liquid at a relatively high temperature while the liquid is being introduced into a reaction space.

Another object of this invention is to provide a nozzle for feeding a liquid to a reaction space which permits non-uniform heating of the liquid at desired positions throughout the length of the conduit. A further object is to provide a means for rapidly heating a high melting liquid in a feed nozzle for introducing said liquid into a reaction space. A still further object is to provide a feeding nozzle having provisions to generate a high temperature in a feeding conduit without the use of high temperature heating elements. Another object of this invention is to provide an apparatus which permits induction heating but minimizes exposure of the induction coil to a high temperature. Further, it is an object of this invention to provide an easily replaceable heating unit for a feeding system. Still another object is to provide a non-corroding atmosphere for an induction heating system.

A further object is to provide a feed line and nozzle assembly integrated with a pressurized reaction vessel and a protective enclosure for isolation of the reaction vessel from the general working space.

The invention is more fully described hereafter and a particular embodiment is illustrated by the drawing which shows an elevation in partial section of an assembled embodiment of the apparatus.

Generally, the apparatus of the present invention includes a nozzle section or assembly, a feed line section between a supply source and the nozzle section and a means of attaching the apparatus to the boundary of a reaction space. Essentially, the apparatus comprises an inner conduit, which serves as the feed line, and an outer conduit positioned concentrically around the feed line so as to define an annular space between it and the inner conduit or fuel line. The nozzle and feed line sections of the apparatus thus include a double walled chamber, having a continuous inner wall as a conduit for the high melting feed material and a segmented outer wall, thereby forming the nozzle and feed line sections having portions of the feed conduit as an inner wall. The inner wall in each section is surrounded by a separate induction coil having its own electrical circuit which permits the temperature of the conduit portion of each section to be independently regulated. The nozzle section of the apparatus is positioned in a receptacle in the reaction wall and then secured to the reactor by means of a flange or similar device, forming part of the outer wall of both the nozzle and feed line sections, so that the outer wall forms a pressure tight portion of the reactor wall.

Referring to the drawing, a particular embodiment of the apparatus is shown providing for the flow of a high melting liquid from a supply or transfer line 71, terminating outside of an enclosure wall 61, to and into a reaction vessel 51, shown only in part. The principal portions of the apparatus are the feed line section 31 and a nozzle section 1.

Referring particularly to the nozzle section 1, the inner wall of the double walled chamber is a feed conduit 2 for transporting a high melting material. The feed conduit 2 is surrounded by a spaced outer wall 3 which is joined to the conduit 2 at its discharge end by a welded seal 4 and at a point upstream of the seal 4 by a perforated disc 5, thereby forming a space 7 for containing an induction heating coil 8. Disc 5 is slidably mounted on conduit 2 and contacts the outer wall 3 at the junction 6. A function of the seal 4 and disc 5 is to align the feed conduit 1 within the surrounding outer wall. A further function of the seal 4 is to prevent the entrance of reactants into the space 7. The induction heating coil 8 encircles the conduit 12 and is separated from the conduit 2 by the high temperature resistant insulation beads or segments 9 which cover the electric wire of coil 8. A refractory insulation is beneficial to the efficient operation of the feeding nozzle since the high operating temperatures of the conduit 2 would have a deleterious effect on conventional electrical insulation. Destruction of the electrical insulation would result in dangerous short circuits which would necessitate costly repair operations. In a non-limiting but preferred example, insulation 9 is in the form of ceramic beads surrounding the electrical wire. The electrical leads to the wire coil 8 enter and leave the feed line section 31 through two couplings 32 (preferably of the explosion proof type) and then enter and leave the nozzle section 1 through perforations 10 in the aligning disc 5 and are connected to an alternating current supply.

The outer wall 3 of nozzle section 1 serves as a protective cover to the wire coil 8 and should be of such construction so as to withstand supra-atmospheric external pressures. Since high temperatures normally have a weakening and corrosive effect on many materials, it is often desirable to protect the outer wall 3 from the high temperatures maintained in the conduit 2. Thus, the residuum of the space 7 is sometimes filled with a thermal insulation material or with an inert gas or with both. Alternatively, the inner face of wall 3 may be lined with a heat reflecting material thereby maintaining the outer wall 3 at a temperature below that of conduit 2.

Turning to the feed line assembly 31, this portion of the apparatus includes part of the conduit 2, and the several segment portions 33, 34, 35 forming the outer wall. The downstream end of the feed line assembly 31 is formed in part by a flange 11 which provides for attachment adjacent the nozzle assembly 1 heretofore described. The upstream end of the feed line assembly is a connection 72 to a supply line 71, this connection being outside the enclosure wall 61.

As with the nozzle section 1, the conduit 2 serves as the inner wall of the portion of the double walled chamber which constitutes the feed line assembly 31. The outer wall of the feed line assembly 31 of the invention shown in the drawing, is a segmental wall section including three separate members 33, 34, 35. These segments are substantially concentric with the conduit 2 forming the inner wall. The diameter and arc length of these curved segments 33, 34, 35 are such that they may be freely passed over a straight section of the conduit 2 surrounded by an induction heating coil 40 hereafter described. This construction assures convenient and rapid assembly as required. The segmental members are connected to each other by flange connections 36, 37 for forming an enclosed space 38.

The space 38 defined by the inner and outer walls of the feed line assembly 31 contains the electrical induction heating system previously mentioned. This heating system includes a layer of insulating material 39 having low thermal and electrical conductivity and surrounding the conduit 2, and an electrical coil 40 encircled around the conduit 2 and the insulating material 39. This arrangement insulates the electrical coil 40 from the heat generated in the inner conduit wall 2 thereby preventing any undue deterioration to the electrical insulation of the wire coil. The electrical leads to the wire coil 40 enter the feed line assembly at a point outside of the firewall 61 and are connected to an alternating current supply which is normally of commercial frequency. The thermal insulation 39 and electrical coil 40 occupy only a portion of the transverse area defined by the inner and outer walls of the feed line assembly 31. The residuum of space 38 is sealed in the proximity of the firewall 61 by discs 41, 42, the space 43 between these discs being packed with a heat insulating material. To prevent losses of heat through the outer wall of the feed line assembly 31, thermal insulating material 44 surrounds the outer wall.

From the foregoing, it is seen that the nozzle assembly 1 and the feed line assembly 31 together define several spaces 7, 38 only partially separated by the perforated disc 5. Separate spaces surrounding the conduit 2 are thus formed for the individual induction heating coils 8, 40. The induction coils thus admit of separate application rates of heat to the portions of the conduit 2. The feed conduit 2 is constructed of steel or some other magnetic material which is susceptible to heating by inductive means. A preferred material would have the property of undergoing a large hysteresis and eddy current effect when subjected to an alternating magnetic field. The outer walls 3, 33, 34, 35 of the several assemblies may be constructed of any suitable metal. In one particular form of the invention stainless steel is a preferred material of construction because of its high resistance to corrosion and high temperature weakening.

Prior to the operation of the nozzle, the apparatus is flushed with an inert gas which enters the feed line section 31 by means of the port 45 then leaves the section through the port 46, thereby providing a nitrogen atmosphere in space 38. Concurrently, similar inert gaseous atmosphere is provided in space 7 by means of gaseous infusion therein via the perforations in the aligning disc 5. This procedure is desirable to insure a non-oxidizing atmosphere about the heated metallic components and thereby prolong the active life of these components by reducing the rate of corrosion. Further, the presence of an inert gas atmosphere excludes the presence of other more reactive gases which can react with any of the reactants which may accidentally enter the chamber containing the induction heating system. In operation, the flow of inert gas into and out of the nozzle free space 7 is minimized by virtue of the limited flow area allowed by the aligning disc 5. Accordingly, convection loss of heat due to circulating gas is reduced.

The introduction and discharge of an inert gas through the ports 45 and 46 develops a gaseous flow between these ports, particularly since the position of disc 41 prevents any general flow of gas past that point in the space 38. While disc 41 does not provide a gas tight seal it does offer a greater resistance to gaseous flow than the discharge port 46. The port 47 permits a pressure gage to be mounted on the section 35 whereby the pressure of the inert gas atmosphere in the space 38 may be measured and thereby controlled so as to provide proper and safe operating conditions. Nitrogen, argon and helium are examples of gases which can be used to provide a desired inert gaseous atmosphere. Generally, in operation, the flow of inert gas is only minute so that it may be regarded as a virtually stationary body.

When in use, the feeding nozzle 1 is positioned in a receiving duct 53 projecting from the reactor vessel 51. The nozzle section 1 and the feed line assembly 31 are firmly connected to the reaction vessel by flange 11 and the connecting bolts 12, 13. The gasket 14 provides a tight seal at the contact points between the nozzle and the reaction vessel and prevents any reactant vapor from escaping the reaction vessel.

When in operation, the electrical alternating current in the wire coils 8 and 40 set up lines of flux in the magnetic material of which the conduit 2 is constructed. This causes alternating voltage and current to be generated within the magnetic material which results in heating of substantially only the conduit 2. This invention therefore provides an apparatus for generating heat within a narrow preferred region to the substantial exclusion of any extraneous development of heat in sections of the apparatus where high temperatures are undesirable. Further, induction heating provides heat which is localized in a narrow segment of the apparatus, viz., the conduit 2. High temperatures are thus readily developed at the point of need without unnecessary heating of other portions of the apparatus. Low voltages are permissible; voltages as low as 5 volts are sufficient to maintain relatively high temperatures in the order of 500–600° C.

The amount of heating is controlled generally by varying the number of ampere turns per unit length of the feed conduit 2. This regulation in the assembled apparatus is provided of course solely by current flow. However, the construction admits of special coil turn concentrations for particular situations. This control of the ampere turn ratio makes possible the uniform or non-uniform heating of the different portions of the conduit 2. Thus, if desired, a higher concentration of heat can be obtained at the delivery point of the nozzle than in other regions of the conduit. This can be advantageous as a means of preventing any build up of solid material at the exit orifice which is the region where the greatest cooling effects occur. Previously, difficulty has been experienced with feed nozzles becoming plugged with solidified material during the operation of the nozzle. This condition required complete dismantling of the apparatus which was a costly operation in terms of time and production lost. The ability to concentrate heat in a particular region, without subjecting the liquid to a higher temperature over the entire feed conduit results in more efficient and economic operation. In instances where the flow of liquid has been stopped for some reason and permitted to solidify in the conduit, the passage of the alternating current through the wire coils 8 and 40 rapidly generates the necessary heat within the conduit to liquefy the solid. This feature of the invention is particularly advantageous in permitting a controlled flow of a high melting liquid material to the reaction vessel. With this technique, the flow of liquid may be stopped when desired and permitted to solidify and then the liquid flow is resumed without any difficulty by applying an alternating electric current to the wire coils. Heretofore this has been a particularly vexatious problem in processes requiring the controlled feeding of high melting liquid materials to a second reactant with which it is particularly reactive. Here the high melting liquid must be added cautiously and carefully. The slow movement of molten material through a feed conduit is conducive to solidification and resultant plugging of the feed system. This present invention provides a solution to this problem in that it is now possible to concentrate the necessary heat at desired specific locations and thereby eliminate any cold spots along the feed conduit 2.

The apparatus described herein is particularly suited for feeding high melting point liquids to reaction vessels in which the internal pressure is substantially above atmosphere. The above described means of attaching the nozzle to the reactor vessel assures a tight seal which does not permit the entrance or exit of any gaseous or liquid material into the reaction system except through the feeding apparatus described herein. This gas tight system permits the maintenance of a supra-atmospheric pressure within the reaction space, and also prevents foreign gaseous matter contaminating the reactants.

The apparatus described above can be used over a wide range of temperatures. The amount of heating can be controlled by the ampere turn ratio applicable to the particular liquid to be heated. For example, to maintain an operating temperature range of 550–650° C. in a nozzle constructed of AISI 4130 steel, it has been found that with a wire turn density of 20 turns around a feed conduit in a nozzle 8 inches long, an electric current of 8 volts and 35 amperes has proved to be very satisfactory. Higher or lower temperature ranges can very easily be obtained merely by varying the ampere turn ratio around the conduit.

While the present invention has been described particularly in a preferred form, it will be understood that other forms may be provided within the scope of the claims which follow.

I claim:

1. A feed device for transfer and feed of a high melting liquid to a reaction space, the transfer path including horizontal and vertical portions, comprising a double walled chamber the inner wall being of magnetically susceptible material, and an electrical induction heating system, the inner wall of the said chamber being a conduit for the high melting material having first and second straight portions joined by a curved portion, one of the straight portions normally passing through the boundary of and into the reaction space, the outer wall being at least three joined segments, including an "a" segment joined to the inner wall first portion at the approximate extremity normally within the reaction space and having means of attaching in an opening in the reaction space boundary to form a portion of the said boundary, a "b" segment surrounding the second portion of the inner wall, and at least one "c" segment with approximately the same curvature as and surrounding the curved portion of the inner wall, the "c" segments having an arc length and cross sectional internal area permitting passing over the second portion of the inner wall when surrounded by the induction heating assembly as hereafter defined, the said inner and outer walls defining a space for receiving an induction heating assembly, the induction heating assembly including a first electrical coil surrounding the first portion of the inner wall, thermal insulation surrounding the second portion and the curved portion of the inner wall, and a second electrical coil surrounding the thermal insulation, the second electrical coil being thereby insulated from the heat generated in the inner conduit wall, the thermal insulation and second electrical coil occupying only a portion of the transverse area defined by the inner and outer walls.

2. A feed system for transfer and feed of a high melting liquid to an isolated reaction space comprising a feed supply line, a feed line and nozzle section, an enclosure wall and a reaction zone, the said enclosure wall being constructed of a fire resistant material and protectively enclosing an area surrounding the said reaction vessel thereby forming a protected reaction compartment, said feed line section penetrating said protective enclosure wall, one extremity of said feed line section terminating outside said protective enclosure wall and connecting to said feed supply line, the opposite extremity of said feed line section terminating within said protected reaction compartment thereby connecting to said nozzle section, said feed line section and nozzle section being double walled chambers having an inner wall common to each of the said sections, said inner wall being a conduit for the high melting material, an outer segmented wall of said double wall chamber being at least three joined segments, the outer wall of said nozzle section being one segment, the said inner and outer walls being joined at the opposite extremities thereby forming a chamber for receiving induction heating elements including an individual insulated electric induction heating coil in the feed line and nozzle sections respectively, said coil encircling the said conduit, means for introducing and maintaining an inert gas atmosphere in the said chamber, said feed line and nozzle sections being adapted to be sealed with the reaction zone to prevent contact of the reactants with said coils or escape of reactants from the reaction zone.

3. A feed system for transfer and feed of a high melting liquid to an isolated reaction space, comprising a feed supply line, a feed line and nozzle section, and a reaction zone, the feed supply line terminating at a point relatively remote from the reaction zone, one extremity of the said feed line section connecting to said supply line, the other extremity of the feed line section connecting to the nozzle section, the feed line section and nozzle section being double walled chambers having an inner wall common to each of the said sections, said inner wall being of material susceptible of induction heating, and forming a conduit for the high melting material, an outer segmented wall of said double wall chamber being a plurality of joined segments the outer wall of said nozzle section being only one segment, the said inner and outer walls being joined at the opposite extremities, thereby forming a chamber for receiving induction heating elements for heating of the inner wall, said elements including an individual insulated electric induction heating coil in the feed line and nozzle sections respectively, said coils encircling the said conduit, means for introducing and maintaining an inert gas atmosphere in the said chamber, said feed line and nozzle section being adapted to be sealed with the reaction zone to prevent contact of the reactants with said coils or escape of reactants from the reaction zone.

4. In an apparatus for feeding a high melting material from a supply source into a confined reaction zone and simultaneously maintaining said material in a molten state, the improvement comprising a conduit of material susceptible of induction heating, said conduit being concentric with a spaced apart wall, said conduit and wall thereby defining an annular space, one end of said conduit and wall terminating within said reaction zone, means joining the conduit and wall positioned at the extremity of said conduit and wall within said reaction space and providing a gas tight seal separating said annular space and reaction space, and another means providing a substantially gas tight seal at the other extremity of the conduit and wall, the conduit consisting of a nozzle portion at the end terminating within the reaction space, and a feed line portion, a plurality of induction heating coil units positioned along the length of said conduit and in the annular space, one of said coil units surrounding closely the nozzle portion, and the coil units around the feed line portion of the conduit being spaced apart from the conduit whereby exposure of the coil to heat generated in the conduit is reduced, the wall including at least two separate but normally joined segments, one of said segments surrounding the nozzle portion and including flanged means for a gas tight seal to said reaction space, and means for maintaining an inert atmosphere within the said annular space.

References Cited in the file of this patent
UNITED STATES PATENTS

| | | |
|---|---|---|
| 1,799,102 | Kelley | Mar. 31, 1931 |
| 2,411,409 | Ballard | Nov. 19, 1946 |
| 2,436,335 | Simonsen | Feb. 17, 1948 |
| 2,521,740 | Osborn, Jr. | Sept. 12, 1950 |